United States Patent
Cheng

(10) Patent No.: US 6,445,527 B1
(45) Date of Patent: Sep. 3, 2002

(54) METHOD AND APPARATUS TO REDUCE MAGNETO-RESISTIVE DRIVE ELECTROMIGRATION AND IMPROVE DRIVE YIELDS

(75) Inventor: Nelson Cheng, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/239,037

(22) Filed: Jan. 27, 1999

(51) Int. Cl.[7] .............................. G11B 15/18; G11B 5/03
(52) U.S. Cl. .............................. 360/69; 360/66; 360/31; 360/62
(58) Field of Search .............................. 360/66, 67, 75, 360/69, 46, 61, 31, 63; 29/603.3; 156/64; 324/210, 207, 21, 212

(56) References Cited

U.S. PATENT DOCUMENTS

| 5,579,186 A | * | 11/1996 | Yamamoto et al. ............ 360/75 |
| 5,774,291 A | * | 6/1998 | Contreras et al. .......... 360/66 X |
| 6,118,611 A | * | 9/2000 | Shibasaki et al. ............. 360/67 |

* cited by examiner

*Primary Examiner*—David Hudspeth
*Assistant Examiner*—K Wong

(57) ABSTRACT

Multi-head disk drive system measures head resistances and selects lowest-resistance heads for track-servo operation during sleep mode, thereby substantially prolonging EM lifetime, improving field failure rate, unit production costs, and drive performance and yields.

12 Claims, 2 Drawing Sheets

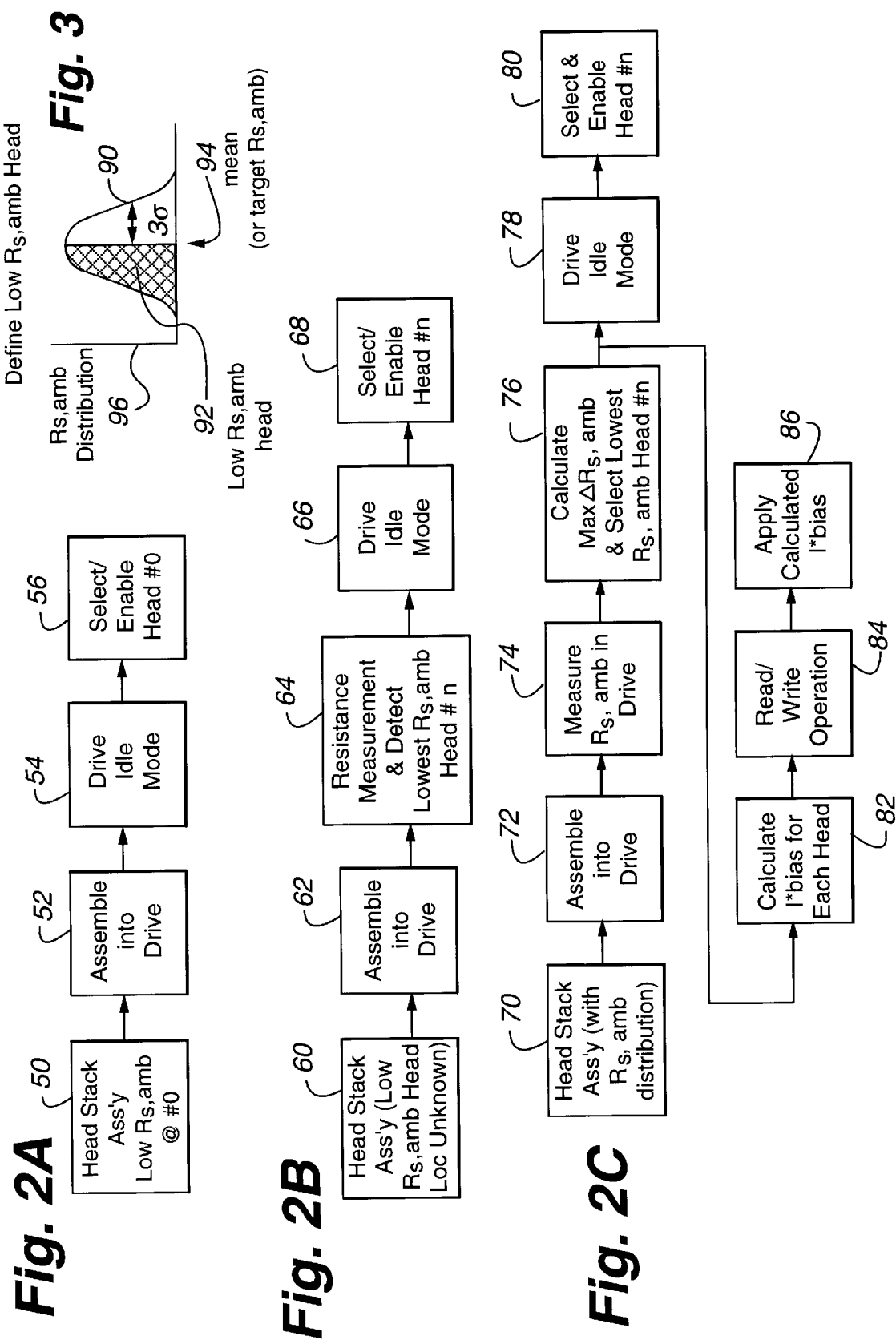

METHOD AND APPARATUS TO REDUCE MAGNETO-RESISTIVE DRIVE ELECTROMIGRATION AND IMPROVE DRIVE YIELDS

FIELD OF THE INVENTION

Invention relates to disk drive electronics, particularly to reduction of electromigration (EM) effect on magneto-resistive (MR) drive media.

BACKGROUND OF INVENTION

Conventional disk drives, especially so-called MR drives, are sometimes produced having increased head resistance to generate higher amplitude for output signals, and, thus, result in overall improved performance and yield. However, high-resistance heads lead to increased EM effect, which results in undesirable field failure over time. Accordingly, such undesirable EM effect caused by high resistance poses a significant challenge to designing and producing high-end drives, having high recording density and higher spindle speeds, and requiring improved head performance at higher drive operating temperatures. In particular, high spindle speed is associated with relatively higher drive operating and head temperatures.

There is a need, therefore, for improved solution to provide high-performance drives, but without substantially contributing to undesirable EM effects.

SUMMARY OF INVENTION

Invention resides in system and/or method associated with disk drive to indicate one or more heads having a range of resistance values for performing specified operation during designated operational mode(s). For example, in multi-MR head system, such head measured to have lowest resistance is selected to perform track-servo operation during sleep or quiescent mode. Hence, in this selective operational manner, EM lifetime for such drive system is substantially prolonged.

BRIEF DESCRIPTION OF DRAWINGS

FIGS. 2A–C are operational flow charts for implementing present invention.

FIG. 3 is a representative resistance data distribution diagram according to present invention.

DETAILED DESCRIPTION OF PREFERRED EMBODIMENTS

Preferred embodiment is implemented in multi-head disk drive system, which determines head resistances of various heads, then selects one or more relatively lower-resistance head for operation during sleep mode, effectively extending system lifetime by reducing undesirable EM effect.

Figure 1A:
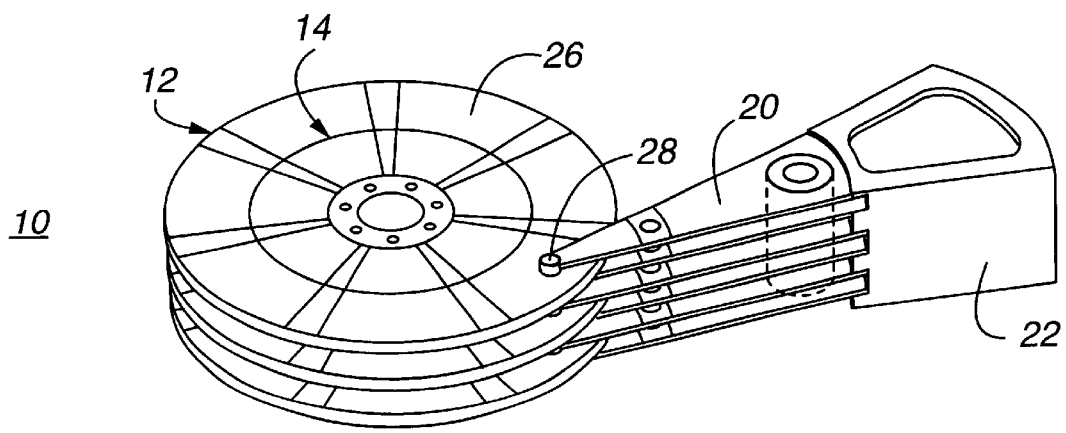
FIGS. 1A–B are mechanical drawings of representative disk drive system for implementing present invention.
Figure 1B:
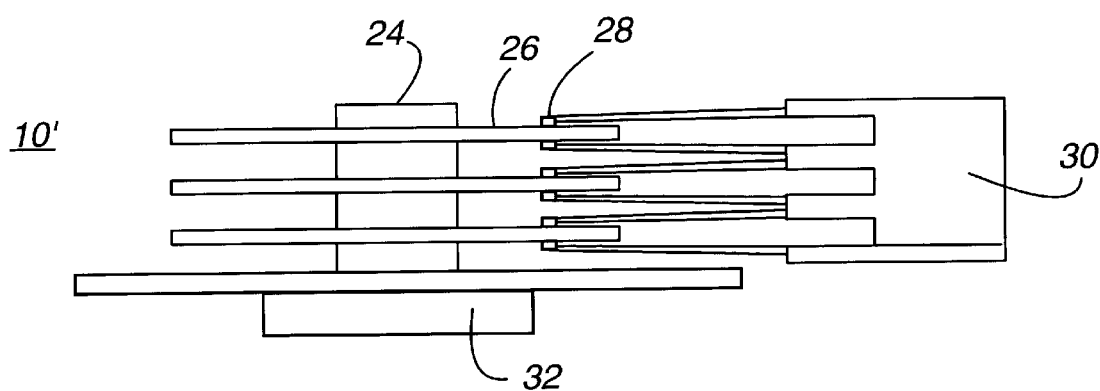

FIG. 1A (top angle view 10) and FIG. 1B (side view 10') show representative electromechanical multiple head or disk drive system, having base 22 or head stack assembly 30, actuator 20, and magnetic heads 28 mounted thereto for coupling magnetically to one or more digital storage disks 26 placed about hub 24 and driven by spindle motor 32. As shown, each disk 26 includes various servo wedge or angular sections and tracks 14, which are selectively accessible for read and/or write operations.

In accordance with important aspect of present invention, operational technique or functional algorithm is applied to single- or multi-disk system for selecting, identifying, or otherwise indicating one or more drive heads which are measured or otherwise determined to have head resistance, or representative value thereof, which is substantially at, within, above, or below one or more specified, calculated or otherwise provided range, threshold, or other value.

More importantly, such selected head(s) is/are, thus, designated, instructed, controlled, or otherwise caused functionally to stop, perform, continue performing, or otherwise operate in one or more specified modes or conditions (e.g., track servo during sleep mode). In this way, EM lifetime of drives is exponentially prolonged compared with conventional drives without such head selection algorithm.

In the present implementation, drive head resistance or other comparable electrical characteristic or signal values and distribution thereof are carefully calculated, monitored, or measured in order to reduce, eliminate, or avoid EM lifetime failure effect or other related long-term electronic media degradation result. In particular, by purposefully selecting those head(s) in a disk drive system or subsystems associated with resistance or other such related values within given range, e.g., lower or upper half of head resistance values in production or manufacturing distribution, then advantageously improved drive yields and performance result.

See FIG. 3 for representative head resistance (Rs, amb) distribution 96, showing low Rs portion 92 for given head measurement or calculated values, as defined by relatively lower portion of distribution curve located to the left of mean or other specified target point 94, such as 3-sigma value 90.

Hence, higher production yields of disk drives serve to reduce production unit costs, effectively by increasing maximum allowed head resistance and/or bias current resulting from decreased power-on times in other heads having higher resistance and EM degradation. Similarly, signal amplitude degradation due to EM effect can be minimized by including such head selection algorithm.

Note that in conventional personal computer or engineering workstation processing units having various commercially-available disk drive storage devices, relative time spent during drive read/write operations, i.e., during which selected drive head is actually operating, and thereby drawing substantial current and power, is estimated to be quite small, perhaps less than 5% of total system operation time. Hence, novel apparatus and process is described herein to take advantage of the time when subject drive is in standby, sleep, quiescent or similar operational mode, particularly when low power, current or voltage is drawn through certain drive heads.

Thus, unlike conventional drive operation, whereby heads are randomly assigned to operate during such sleep mode (and all other modes), and duty cycle for lifetime calculation, for example, of a two-head drive is usually 50%, present approach uses novel head selection algorithm, such that duty cycle is comparatively reduced to 10% or less for selected head(s), and, thus, resultant maximum allowed resistance is substantially increased. Hence, instead of limiting head resistance per EM test result effectively to worst-case drive operating conditions (i.e., assigning head operation randomly among available drives during sleep mode), present approach achieves optimized system resource utilization by selective head utilization to reduce long-term undesirable EM effects.

More particularly, relationship between EM lifetime to head resistance is described or modeled numerically according to following formula:

$$EM \text{ time to failure } (TTF) = AJ-2\exp-(Q/kT)$$

where:

A: configuration constant,

J: current density through MR head stripe,

Q: activation energy, k: Boltzmann constant, and

T: sensor stripe temperature at usage condition.

Foregoing formula specifies relationship that drive head with relatively higher resistance shall have short lifetime, i.e., prior to EM failure. This relationship is due in large part to: (1) current density being calculated to be higher because of relatively smaller cross sectional area in head sensor region; and (2) T value being calculated to be relatively higher due to increased joule heating, i.e., I2R (i.e., head resistance). Hence, EM lifetime increases by more than an exponential factor by selectively using relatively low resistance head.

Moreover, other factors may contribute to head resistance distribution, such as manufacturing characteristics associated with head vendor processes or materials. For example, with 3-sigma resistance distribution range of 6 to 10 ohms, nominal head resistance is 6 to 10 ohms lower than EM-determined maximum allowed resistance, thereby reducing head and drive yield due to low signal amplitude. In such case, head vendors may dispose head units which are screened at higher than certain EM resistance limit, thereby keeping nominal resistance within specified range. Accordingly, head and overall drive costs increase.

In preferred implementation, one or more selected heads are provided in disk drive system, whereby such selected head(s) passes performance criteria and measured head resistance falls within lower half of production distribution. In this purposeful approach, selection algorithm or other computer- or electronically automated methodology serves to identify deliberately such head(s) which shall be built-in, configured, or otherwise pre-designated for operation subsequently during idle, standby, sleep or quiescent mode, e.g., for performing relatively low-current track-servo task.

In accordance with preferred methodology, initially, actual current resistance values of heads in candidate set for drive application are each measured by applying test current or voltage thereto. Head resistance testing accuracy or resolution may vary according to available screening equipment and process, so long as measurement electronics and/or firmware discerns specified minimum testable difference (e.g., one ohm variance).

Generally, present selection algorithm is more easily satisfied when resistance distribution tested or otherwise determined from heads received and tested from suppliers is or likely to fall substantially wider than specified testing range. Hence, such purposely included low-resistance head (s) may be built-in and designated in drive systems at certain position associated with pre-determined operational mode (e.g., sleep mode). Preferably, in-drive resistance measurement is avoided. Also, head bias current may be increased based on resistance difference between highest and purposely-built head to achieve better drive performance or yields.

In another embodiment of present invention contemplated herein, instead of purposely including low-resistance head, lowest resistance head is selected for drive servo tracking subsequently, i.e., substantially during idle mode. In this alternative case, higher signal amplitude may be generated from head, without: degrading EM performance, and bias current is increased proportionally to resistance difference between lowest and highest heads.

Hence, advantageously, present method and apparatus provides improved solution for high-performance drives, without substantially contributing to undesirable EM effects. In particular, duty cycle is reduced on high-resistance heads, while maximum allowed head resistance is increased. For example, when head resistance is increased, head production yield, drive yield and performance are improved correspondingly.

As case illustration of production improvement, EM characteristics are represented by TTF@5%, TTF@5%=16000*(1/Tstripe)−26; stripe temperature at 80 degrees C. environment is expressed by Tstripe=0.0247*Rs,amb2+0.419*(R,amb)+62.98. Here, such values represent actual head test results, whereby maximum allowed resistances at various duty cycles are determined to increase about 9 ohms, when duty cycle drops from 50% to 5%. Thus, when vendor sets mean target resistance at 57 ohms, for example, with one sigma of resistance variation 3 ohms, then head yield is expected to increase about 32% when duty cycle drops from 50% to 5%.

Another important advantage pertains to lifetime prolongation and EM failure rate reduction. Referring to above case illustration, when 55 (or less) ohm head is selected for servo tracking during idle mode, then maximum allowed head resistance in drive is objectively determined to increase to about 67 ohms, without EM failure. Note, when total actual power-on time on such 67 ohm head is under 0.25 year, then present case is calculated to provide 5 year×5% duty cycle.

To illustrate preferred implementation of present invention, FIG. 2A flow chart provides operational steps, wherein low resistance value (i.e., Rs, amb @ fixed location) is purposefully built-in the head stack assembly at one or more specified disk head locations. Initially, head stack assembly 30 and associated processor or control electronics, firmware, and/or software are configured, programmed or otherwise pre-specified 50, such that one or more drive head locations are designated, selected, or otherwise indicated to be associated with low (or high) resistance.

Then, multiple drive heads, disks, and other system components are properly assembled, manufactured, or otherwise built 52. Furthermore, during such disk drive system operation, such system is caused to operate 54 in idle, quiescent, sleep, or otherwise low-current operational mode or state. At such event, such system is then caused to select, enable, or otherwise cause to function certain pre-designated head (e.g., here, drive head #0) to serve operational activity, such as servo-tracking, during such sleep mode. Hence, during other non-sleep operational modes, various operational activities, such as disk read and/or write accesses may be performed by some or all available system heads.

Referring to FIG. 2B flow chart, an alternative embodiment of present invention is illustrated, whereby low-resistance head location is not necessarily fixed prior to system assembly. Here, initially, head stack assembly 30 is properly configured 60 and assembled 62, however, low-resistance head location(s) is yet unknown. After system assembly, head resistance measurements are performed on some or all drive heads included therein to detect 64 the lowest (or highest) resistance: head measurements and stack locations.

Similarly to foregoing preferred embodiment, present solution serves to identify or otherwise designate certain low-resistance heads for subsequent selection, operation or otherwise enablement 68 when drive enters idle mode 66.

Referring now to FIG. 2C flow chart, another alternative embodiment of present invention is illustrated, whereby low-resistance head location is not necessarily purposefully built-in initially the subject disk drive system. Here, initially, head stack assembly 30 is properly configured 70 and assembled 72 without regard to head resistance. After system assembly, head resistance measurements are performed on some or all drive heads included therein to detect 74 lowest (or highest) resistance head measurements and stack locations.

Then, system processor, computer, or other calculating program serves to calculate 76 maximum head resistance range (e.g., Δ Rs, ambient) among various system heads, so as preferably to select the lowest (or highest) resistance head measurement and stack location. Next, system disk drive may enter idle mode 78, whereupon such selected low-resistance head is designated to conduct idle-mode operation, such as servo-tracking.

Optionally, system processor may calculate 82 one or more head signal-related values, such current Ibias (where: Ibias=K Ibias,max) thereby being associated with electromigration presence. Then, disk read/write access operations may occur 84, and such calculated Ibias current being applied to selected drive head electronics.

Foregoing described embodiments of the invention are provided as illustrations and descriptions. They are not intended to limit the invention to precise form described. In particular, Applicant contemplates that functional implementation of invention described herein may be implemented equivalently in hardware, software, firmware, and/or other available functional components or building blocks.

More particularly, presently described and claimed apparatus and method is contemplated to be applicable to various disk drive applications and subsystems having relatively high amount of drive idle time, as well as various magneto-resistive media, such as so-called GMR and AMR drives. Other variations and embodiments are possible in light of above teachings, and it is thus intended that the scope of invention not be limited by this Detailed Description, but rather by Claims following.

What is claimed is:

1. A multi-disk storage apparatus comprising:

a first disk; a second disk; a first head associated with the first disk; a second head associated with the second disk; and means for determining a first resistance value associated with the first head and a second resistance value associated with second head, said means selecting the first head or the second head according to the determined resistance values, wherein the head having a lowest resistance is selected for performing a track-servo operation during a sleep mode, thereby effectively prolonging electromigration lifetime, improving field failure rate, reducing production cost, or increasing drive performance and yield.

2. The apparatus of claim 1 wherein:

the sleep mode corresponds with a comparatively low-current operational state.

3. The apparatus of claim 1 wherein:

the first and second heads comprise magneto-resistive devices.

4. The apparatus of claim 1 wherein:

the first and second resistance values are determined from pre-assembly test data associated with each such head.

5. In a multi-disk drive system comprising a head assembly and a plurality of disks, a method for reducing electromigration effect on one or more drive heads, the method comprising the steps of:

operating a first drive head in a first mode to access a first disk;

operating a second drive head in a second mode to access a second disk;

measuring a first resistance of the first drive head and a second resistance of the second drive head; and determining that the second resistance is less than the first resistance;

wherein the second mode comprises a quiescent state and wherein the second drive head performs a servo-tracking operation of the second disk during the quiescent state.

6. The method of claim 5 wherein:

the first mode is associated with an active read or write operation by the first drive head of the first disk.

7. The method of claim 5 further comprising the step of:

operating a third drive head in a third mode to access a third disk;

wherein the third mode comprises a quiescent state.

8. The method of claim 7 wherein:

a first resistance of the first drive head is greater than a third resistance of the third drive head.

9. In a multi-disk drive system comprising a head assembly and a plurality of disks, a method for reducing electromigration effect on one or more drive heads, the method comprising the steps of:

operating a first drive head in a first mode to access a first disk;

operating a second drive head in a second mode to access a second disk, the second mode comprising a quiescent state;

operating a third drive head in a third mode to access a third disk, wherein the third mode comprises a quiescent state;

measuring a first resistance of the first drive head, a second resistance of the second drive head, and a third resistance of the third drive head;

determining that the third resistance is less than the first resistance and the second resistance; and causing the third drive head to perform a servo-tracking operation of the third disk.

10. An improved disk drive assembly method comprising the steps of:

measuring a signal associated a first disk head having a first resistance value;

measuring a second signal associated a second disk head having a second resistance value;

indicating for an operational mode one or more such disk heads according to the measured signals; and assembling the first and second disk heads in a disk drive assembly, wherein the operational mode comprises a sleep mode during which each indicated disk head operates for servo-tracking, each indicated disk head having a relatively lower resistance value.

11. The method of claim 10 wherein:

the disk drive assembly comprises a plurality of disks, each disk being accessible by a corresponding magneto-resistive type head.

12. An improved disk drive apparatus comprising:

a plurality of storage disks;

a plurality of drive heads, each drive head being associated with a corresponding one of the plurality of storage disks;

means for determining a resistance value for each of the plurality of drive heads; and means for selecting the drive head having a lowest resistance value to perform a track-servo operation during a low current operational state, thereby reducing undesirable electromigration effects.

* * * * *